(12) United States Patent
Kim (10) Patent No.: US 8,091,473 B2
(45) Date of Patent: Jan. 10, 2012

(54) JUICE EXTRACTOR

(76) Inventor: Young-Ki Kim, Gimhae-si (KR)

( * ) Notice: Subject to any disclaimer, the term of this patent is extended or adjusted under 35 U.S.C. 154(b) by 714 days.

(21) Appl. No.: 12/295,869

(22) PCT Filed: Apr. 27, 2007

(86) PCT No.: PCT/KR2007/002087
§ 371 (c)(1),
(2), (4) Date: Oct. 3, 2008

(87) PCT Pub. No.: WO2007/148872
PCT Pub. Date: Dec. 27, 2007

(65) Prior Publication Data
US 2009/0049998 A1 Feb. 26, 2009

(30) Foreign Application Priority Data
Jun. 21, 2006 (KR) .......................... 10-2006-0055656

(51) Int. Cl.
*A23N 1/00* (2006.01)
(52) U.S. Cl. ................. 99/510; 99/495; 99/501; 99/502; 99/509; 99/513; 241/24.11; 241/24.26; 241/82.1; 241/260.1; 241/282.1; 100/117; 100/131; 100/145; 366/133; 366/157.3; 366/186; 366/194; 366/249; 366/266; 366/318
(58) Field of Classification Search ............... 99/495, 99/501, 502, 509, 510, 513; 241/24.11, 24.26, 241/82.1, 260.1, 282.1; 100/117, 131, 145; 366/133, 157.3, 186, 194, 249, 266, 318
See application file for complete search history.

(56) References Cited

U.S. PATENT DOCUMENTS

| | | | | |
|---|---|---|---|---|
| 1,906,054 A | * | 4/1933 | Freese | 99/512 |
| 2,109,048 A | * | 2/1938 | Lorenzen | 99/512 |
| 2,186,672 A | * | 1/1940 | Fromm | 99/503 |
| 2,311,379 A | * | 2/1943 | Gillanders | 99/512 |
| 2,960,926 A | * | 11/1960 | McKee | 100/117 |
| 3,135,193 A | * | 6/1964 | Hunt | 100/117 |
| 3,139,126 A | * | 6/1964 | Fromm et al. | 99/504 |
| 3,527,158 A | * | 9/1970 | Young | 100/117 |
| 3,966,607 A | * | 6/1976 | Gaynor et al. | 210/137 |

(Continued)

FOREIGN PATENT DOCUMENTS

KR 1995-0005349 3/1995

(Continued)

*Primary Examiner* — Gene Kim
*Assistant Examiner* — Alexander Niconovich
(74) *Attorney, Agent, or Firm* — Ladas & Parry LLP (57) ABSTRACT

A juice extractor capable of extracting juice from vegetables, fruits or soymilk from beans is disclosed. The extractor includes a housing having a draff outlet port and a juice outlet port, a screw having an upper rotary shaft inserted in a rotary shaft hole of the housing and a lower rotary shaft with a plurality of screw spirals formed on an outer periphery thereof, and a mesh drum for extracting the juice toward the juice outlet port, and a rotary brush mounted between the housing and the mesh drum and having a brush holder. Various nutrients and intrinsic flavor contained in the vegetables or fruits are maintained to the fullest extent by employing a very low speed screw of a squeezing mode. Also, since the housing accommodating the screw is vertically fixed to an upper portion of a drive unit, the material is automatically moved downward without pressing the material down, and the draff is discharged while squeezing and grinding the materials put in an inlet port.

13 Claims, 8 Drawing Sheets

U.S. PATENT DOCUMENTS

| | | | |
|---|---|---|---|
| 3,976,001 A * | 8/1976 | Trovinger | 99/513 |
| 4,106,401 A * | 8/1978 | Ackeret | 99/508 |
| 4,287,058 A * | 9/1981 | Larsen | 210/112 |
| 4,347,134 A * | 8/1982 | Svehaug | 210/147 |
| 4,385,553 A * | 5/1983 | Ihara et al. | 99/510 |
| 4,393,760 A * | 7/1983 | Hasegawa | 99/510 |
| 4,429,626 A * | 2/1984 | Ihara et al. | 99/510 |
| 4,506,601 A * | 3/1985 | Ramirez et al. | 99/511 |
| 4,587,896 A * | 5/1986 | Steinke | 100/117 |
| 4,614,153 A * | 9/1986 | Kurome et al. | 99/511 |
| 4,700,621 A * | 10/1987 | Elger | 99/511 |
| 4,840,119 A * | 6/1989 | Caldi | 99/512 |
| 4,872,404 A * | 10/1989 | Quetsch et al. | 100/125 |
| 4,941,404 A * | 7/1990 | Tegtmeyer | 100/117 |
| 4,974,506 A * | 12/1990 | Luhrs et al. | 100/102 |
| 5,156,872 A * | 10/1992 | Lee | 426/489 |
| 5,190,160 A * | 3/1993 | Murphy et al. | 209/270 |
| 5,257,575 A * | 11/1993 | Harrison et al. | 99/511 |
| 5,355,784 A * | 10/1994 | Franklin et al. | 99/492 |
| 5,381,730 A * | 1/1995 | Kim | 99/510 |
| 5,396,836 A * | 3/1995 | Kim | 99/510 |
| 5,421,248 A * | 6/1995 | Hsu | 99/512 |
| 5,452,650 A * | 9/1995 | Lee | 99/510 |
| 5,479,851 A * | 1/1996 | McClean et al. | 99/512 |
| 5,495,795 A * | 3/1996 | Harrison et al. | 99/492 |
| 5,537,918 A * | 7/1996 | Patel et al. | 99/511 |
| 5,592,873 A * | 1/1997 | Lee | 99/510 |
| 5,638,745 A * | 6/1997 | Lokhandwala et al. | 99/510 |
| 5,662,035 A * | 9/1997 | Lee | 100/112 |
| 5,669,289 A * | 9/1997 | Chen | 99/511 |
| 5,743,176 A * | 4/1998 | Anderson et al. | 99/512 |
| 5,784,954 A * | 7/1998 | Kokot et al. | 99/511 |
| 5,896,812 A * | 4/1999 | Basora et al. | 99/511 |
| 5,906,154 A * | 5/1999 | Yoon et al. | 99/510 |
| 5,924,357 A * | 7/1999 | Chen | 99/511 |
| 6,050,180 A * | 4/2000 | Moline | 99/511 |
| 6,070,519 A * | 6/2000 | Sham et al. | 99/348 |
| 6,071,378 A * | 6/2000 | Saito | 162/58 |
| 6,135,018 A * | 10/2000 | Yu et al. | 99/504 |
| 6,138,556 A * | 10/2000 | Yu et al. | 99/504 |
| 6,394,377 B1 * | 5/2002 | Kim et al. | 241/260.1 |
| 6,397,736 B1 * | 6/2002 | Tseng et al. | 99/511 |
| 6,536,335 B1 * | 3/2003 | Ashworth | 99/501 |
| 6,606,939 B1 * | 8/2003 | Tateno | 99/510 |
| 6,637,323 B2 * | 10/2003 | Kim | 99/510 |
| 6,658,996 B2 * | 12/2003 | Eom | 99/510 |
| 6,722,268 B2 * | 4/2004 | Catelli et al. | 99/510 |
| 6,854,382 B2 * | 2/2005 | Jan | 99/510 |
| 6,861,004 B2 * | 3/2005 | Benenson et al. | 210/785 |
| 6,862,981 B1 * | 3/2005 | Yen | 99/492 |
| 7,040,220 B1 * | 5/2006 | Cohen et al. | 99/511 |
| 7,044,051 B2 * | 5/2006 | Le Rouzic | 99/512 |
| 7,066,082 B2 * | 6/2006 | O'Loughlin | 99/511 |
| 7,080,594 B2 * | 7/2006 | Lin | 99/511 |
| 7,481,155 B2 * | 1/2009 | Larsen | 99/511 |
| 2002/0088352 A1 * | 7/2002 | Yip | 99/495 |
| 2003/0052206 A1 * | 3/2003 | Fouquet | 241/92 |
| 2003/0061944 A1 * | 4/2003 | Fouquet | 99/511 |
| 2003/0154867 A1 * | 8/2003 | Kim | 99/510 |
| 2004/0007139 A1 * | 1/2004 | Catelli et al. | 99/510 |
| 2004/0231529 A1 * | 11/2004 | Jan | 99/495 |
| 2007/0056450 A1 * | 3/2007 | Hensel | 99/495 |
| 2007/0089613 A1 * | 4/2007 | Wu Chang | 99/495 |
| 2007/0277682 A1 * | 12/2007 | Wong | 99/495 |
| 2008/0202355 A1 * | 8/2008 | Krall et al. | 99/513 |
| 2009/0064875 A1 * | 3/2009 | Trovinger | 99/492 |
| 2009/0229478 A1 * | 9/2009 | Wu | 99/495 |
| 2009/0272280 A1 * | 11/2009 | Cheung et al. | 99/513 |
| 2010/0058938 A1 * | 3/2010 | Rivera | 99/495 |

FOREIGN PATENT DOCUMENTS

| | | |
|---|---|---|
| KR | 1995-0010797 | 5/1995 |
| KR | 1998-046647 | 9/1998 |

* cited by examiner

Fig. 1

Prior Art

JUICE EXTRACTOR

TECHNICAL FIELD

The present invention relates to a juice extractor capable of extracting juice from vegetables, fruits, or soymilk from beans, and more particularly to a juice extractor which performs an excellent juice-extracting function irrespective of kinds of vegetables or fruits, and maintains the freshness of juice by employing a very low speed rotating method, so that the size of the juice extractor and noise are greatly reduced, and the assembling, disassembling, and cleaning of the juice extractor can be simply performed.

BACKGROUND ART

For a healthy livelihood, directly making and taking juice including green juice at home is on the increase. For this, many apparatuses that can simply extracting juice from vegetables or fruits at home have been provided.

The existing juicers crushes materials put into an inlet port at high speed and produces juice in a centrifugal separation method. However, the existing juicers have the drawbacks in that during such a high-speed crushing process, intrinsic flavor and nutrients contained in fruits may be destroyed, and it is difficult to extract green juice from vegetables having branches or leaves. It is also difficult to extract juice from fruits having a high viscosity such as kiwi or strawberry, and it is impossible at all to extract soymilk from beans. In addition, for continuous extraction of juice from vegetables or fruits, it is required to frequently disassemble and clean the juicer to remove draff (i.e., residue) caught in meshes of a strain net.

Figure 1:
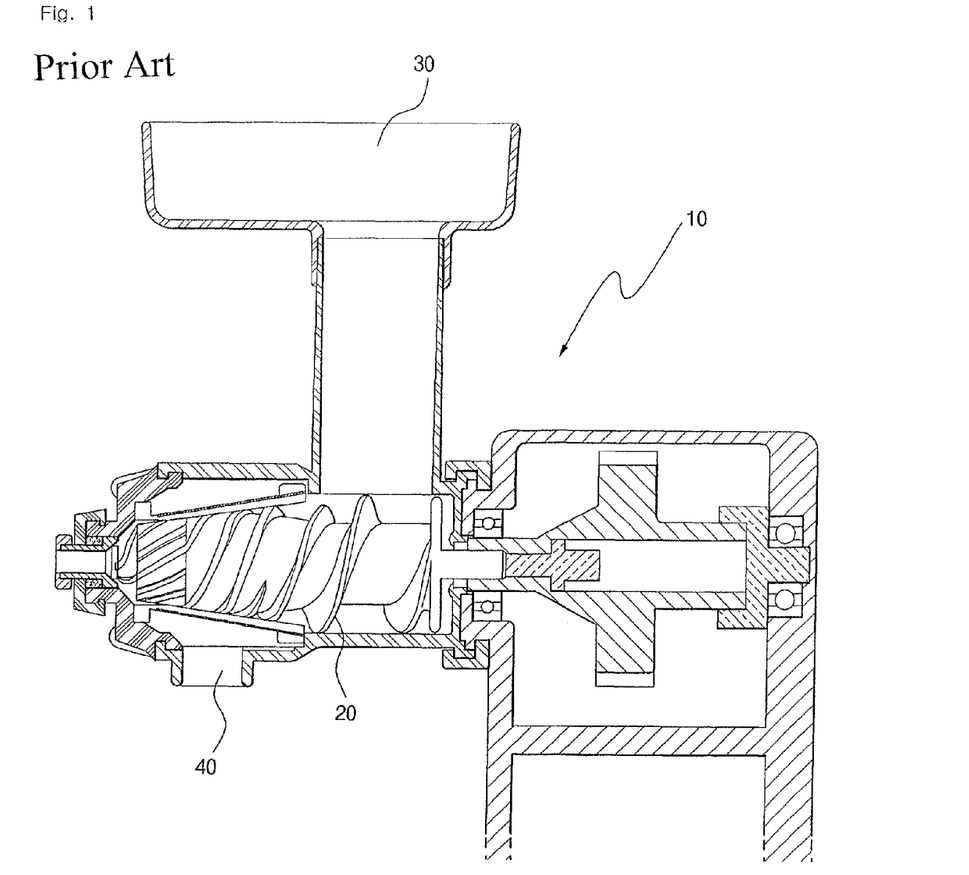
FIG. 1 is a sectional view of a conventional juice extractor.

Korean Utility Model Registration No. 190676, which has been granted to the applicant, discloses a grinder combined with a juice extractor. FIG. 1 is a sectional view illustrating the structure of a conventional juice extractor. As shown in FIG. 1, the conventional juice extractor 10 is provided with a long screw 20 horizontally assembled in a drum together with a juice-extracting net and a drum cap and engaged with a side surface of a drive unit. Thus, the juice extractor is horizontally lengthened, and performs the juice extraction as materials put into an inlet port 30 are horizontally transferred at low speed.

Accordingly, wide space is required in using or keeping the juice extractor 10 in custody. Also, since the juice extraction is performed as the materials are horizontally moved, the juice-extracting speed becomes low, and thick juice cannot flow downward well, but remains in the drum. Also, since no rotary shaft is provided on one side of the screw 20, the screw 20 having no rotary shaft is shaken when it is rotated, and collides with wall blades formed on an inner wall of the juice-extracting net to cause noise and abrasion of the screw to occur.

In addition, since the juice outlet port 40 is in a low position, only a low juice cup can be used, and it is impossible to use a long juice cup.

DISCLOSURE

Technical Problem

The present invention has been made in view of the foregoing problems, and it is an object of the present invention to provide a juice extractor which can prevent beans or vegetables from becoming stale and make extracted juice well flow downward irrespective of the kinds of vegetables or fruits, i.e., even if the extracted juice is a thick fruit juice or soymilk.

Another object of the present invention is to provide a juice extractor which can heighten the speed of juice extraction and make the extracted juice well flow downward without remaining in a housing.

Still another object of the present invention is to provide a juice extractor which can prevent shaking or striking of a juice-extracting screw upon operation of the screw and thus reduce noise occurrence with the abrasion of the screw prevented.

Still another object of the present invention is to provide a juice extractor which can make materials automatically move downward without pressing the materials, and can be continuously used without the necessity of frequently disassembling and cleaning the juice extractor.

Technical Solution

In order to achieve the above objects, in one aspect of the present invention, there is provided a juice extractor, which includes a cover having an inlet port formed on one side of an upper part thereof and a rotary shaft hole formed in the center of an inner part thereof; a housing installed on a lower part of the cover, and having a guide jaw formed on a bottom of the housing, a draff outlet port and a juice outlet port formed apart from each other on a lower end part of the housing, a waterproof cylinder having a through hole and formed in the center of the lower end part of the housing, and a pressure discharge passage formed around a lower part of the waterproof cylinder; a screw having an upper rotary shaft formed on an upper part of the screw to be rotatably inserted into the rotary shaft hole, a plurality of screw spirals formed on an outer surface of the screw, an inner ring formed at a lower end of the screw to project downward and having a plurality of screw gears rotatably inserted into the pressure discharge passage, a lower space formed inside the inner ring to receive the waterproof cylinder therein, and a lower rotary shaft formed in the center of a lower part of the screw and a polygonal shaft hole formed thereon; a mesh drum having a mesh structure formed on an outer wall of the mesh drum to discharge juice to the juice outlet port, and a plurality of wall blades longitudinally formed on an inner surface of the mesh drum to be inserted into the guide jaw; a rotary brush installed between the housing and the mesh drum to be rotated, and having a brush holder in which a brush for continuously sweeping the mesh drum and the housing is installed; and a drive unit having a polygonal shaft that is inserted into the polygonal shaft hole through the through hole of the waterproof cylinder, and rotating the screw at a low speed; wherein the housing accommodating the screw is longitudinally fixed to an upper side of the drive unit so as to press, grind and extract juice from materials put into the inlet port and to discharge the draff.

The pressure discharge passage of the housing may be connected to the juice outlet port.

The draff discharge means may include a discharge jaw formed at an end of a lower part of the spirals of the screw by internally cutting a lower border of the screw; a bottom ring formed at an end of a lower part of the mesh drum, and having an inner ring insertion hole formed thereon to accommodate the inner ring; a discharge slant surface formed on an upper surface of the bottom ring, the discharge slant surface being in the form of a circular arc of which the depth is increased in a rotating direction of the screw; a mesh drum discharge hole connected to an end of the discharge slant surface to discharge the draff out of the mesh drum; and a housing discharge hole formed on one side of the bottom of the housing and connected to the mesh drum discharge hole and the draff outlet port; wherein the discharge jaw discharges the draff to the draff outlet port through the housing discharge hole by pushing the draff to the mesh drum discharge hole as the discharge jaw is rotated along the discharge slant surface.

A circular projection may be formed at an edge of an inner side of the bottom ring, a circular groove may be formed on an outer side of the circular projection, an outer ring may be formed on an outer periphery of the inner ring to project downward, and a circular projection insertion hole may be formed between the inner ring and the outer ring; and wherein the outer ring is ratatably inserted into the circular groove to extend a contact area with the draff being guided by the discharge jaw, and the circular projection is inserted into the circular projection insertion hole to minimize an inflow of the draff to the pressure discharge passage.

A strain net and a pressing net having a plurality of meshes formed thereon may be formed on an upper part and a lower part of an outer wall of the mesh drum, and a sealing structure in which a plurality of grinding blades 390 are longitudinally formed may be formed between the strain net and the pressing net; wherein the juice is discharged to the juice output port through the strain net and the pressing net.

A plurality of engagement jaws may be formed on a border of a lower end part of the cover, a plurality of engagement projections may be formed on an outer periphery of an upper end of the housing, engagement hooks may be formed on the drive unit, wherein the housing that is engaged with the cover by the engagement of the engagement jaws with the engagement projections is detachably secured to the drive unit by the engagement hooks.

The brush may be composed of a net brush attached to an inner surface of the brush holder to continuously sweep the outer wall of the mesh drum, and a housing brush attached to an outer surface of the brush holder to continuously sweep the inner wall of the housing.

A brush gear may be mounted on a lower part of the brush holder, and an intermediate gear may be rotatably mounted on the lower surface of the housing to be engaged with the brush gear; wherein the intermediate gear, which is engaged with the screw gear, rotates the brush gear.

A slant surface may be formed on a lower end surface of the inlet port of the cover in the rotating direction of the screw.

The draff discharge means may further include an elastic packing mounted on one side of the bottom surface of the housing discharge hole, one side of the packing being inserted into an insertion groove formed on the bottom surface of the housing to achieve sealing, and the other side thereof being in close contact with an outlet of the housing discharge hole.

The cover may further include a securing projection formed on an outer periphery of the cover, the securing projection being positioned in the rear under the assumption that the juice outlet port and the draff outlet port of the housing are positioned in the front.

The drive unit may include a base frame in which a motor and a control device are installed, a housing engagement surface formed on an upper surface of the base frame, a polygonal shaft of the motor formed to project in the center of the engagement surface, a plurality of engagement hooks formed on an outer periphery of the engagement surface to secure the housing, a support frame having a mounting surface formed on one side of the housing engagement surface of the base frame to correspond to a side surface of the housing and extending from the base frame to support the housing, a securing groove which is formed on an upper surface of the support frame and to which the securing projection of the cover is secured, and a handle unit extending from an upper end of a rear surface of the housing mounting surface of the support frame to a lower end of the base frame.

Advantageous Effects

According to the juice extractor as constructed above according to the present invention, various nutrients and intrinsic flavor contained in juice, soymilk, and so forth, are maintained to the fullest extent, by adopting a screw squeezing at a very low speed instead of crushing using a high-speed rotating blade, and the extensive juice extraction is possible irrespective of the kinds of vegetables and fruits.

The housing of the juice extractor is longitudinally assembled to the upper side of the drive unit, and thus the materials are naturally moved downward by the gravity and the rotation of the screw, and the juice-extracting speed is heightened. Accordingly, the extracted juice well flows downward without remaining in the housing, and thus any kind of vegetables and fruits can be juiced promptly.

Further, since the screw is bidirectionally fixed, and thus the vibration of the screw is prevented, shaking or striking of the screw against the inner wall of the mesh drum is prevented during the operation of the screw to reduce the noise occurrence and to prevent abrasion of the screw.

Furthermore, since the slant surface is formed on one side of the lower surface of the juice extractor cover, the materials are automatically put in the inlet port without pressing the materials downward.

BRIEF DESCRIPTION OF THE DRAWINGS

The foregoing and other objects, features and advantages of the present invention will become more apparent from the following detailed description when taken in conjunction with the accompanying drawings in which.

BEST MODE

Hereinafter, preferred embodiments of the present invention will be described in detail with reference to the accompanying drawings. The matters defined in the description are nothing but specific details provided to assist those of ordinary skill in the art in a comprehensive understanding of the invention, and the present invention is only defined within the scope of the appended claims.

Figure 2:
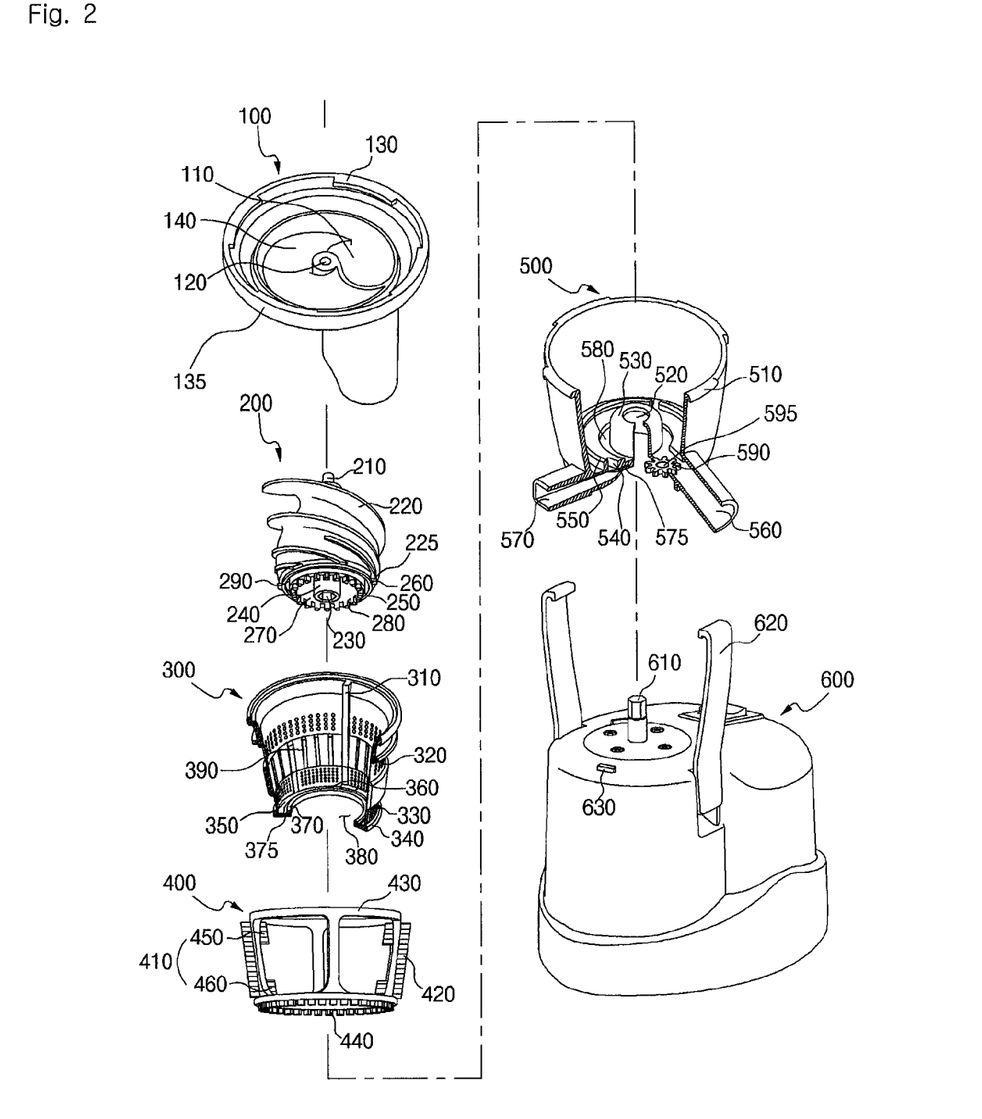
FIG. 2 is an exploded perspective view of a juice extractor according to an embodiment of the present invention.
Figure 3A:
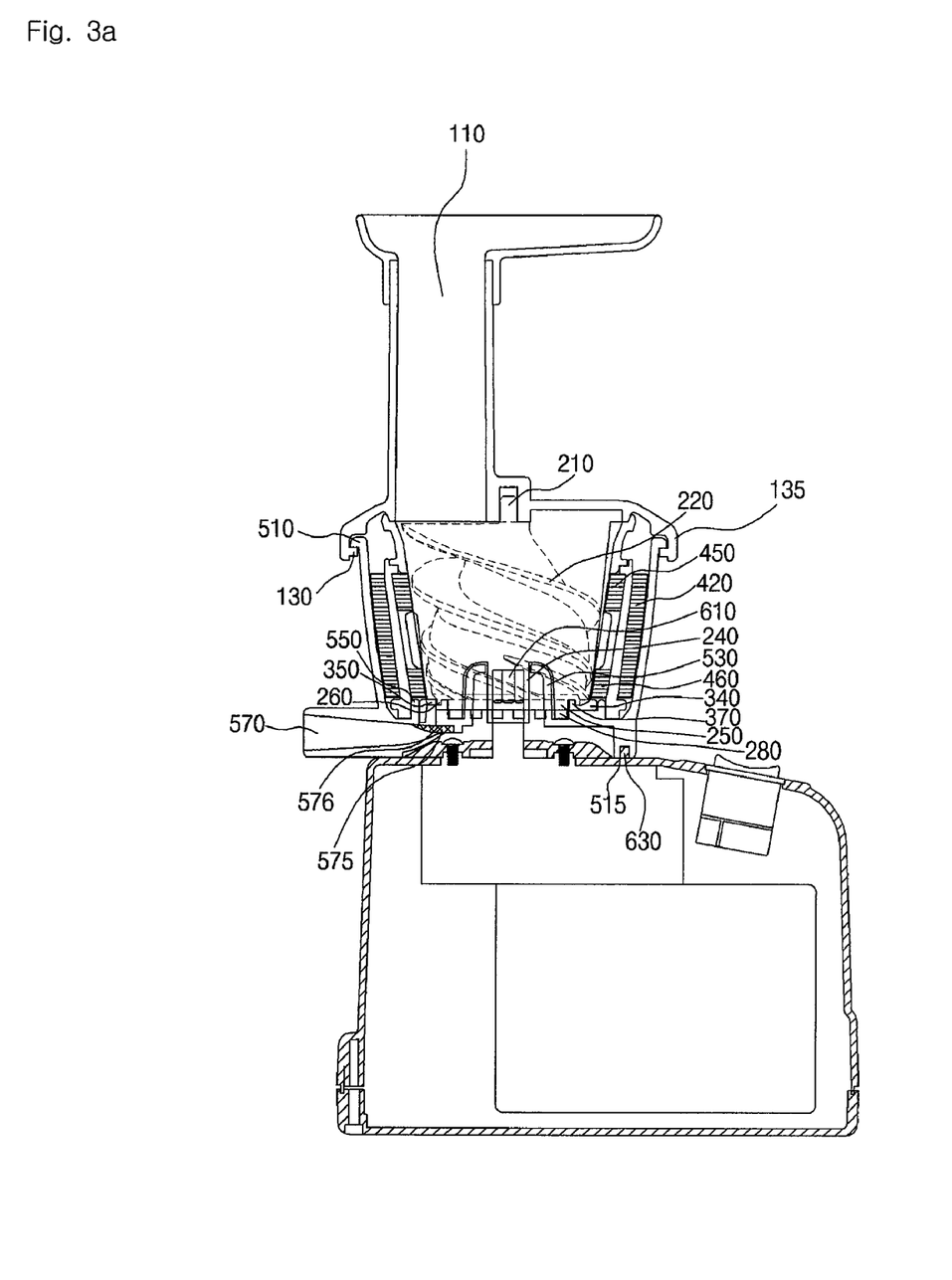
FIG. 3A is a sectional view of a draff outlet port of a juice extractor according to an embodiment of the present invention.
Figure 3B:
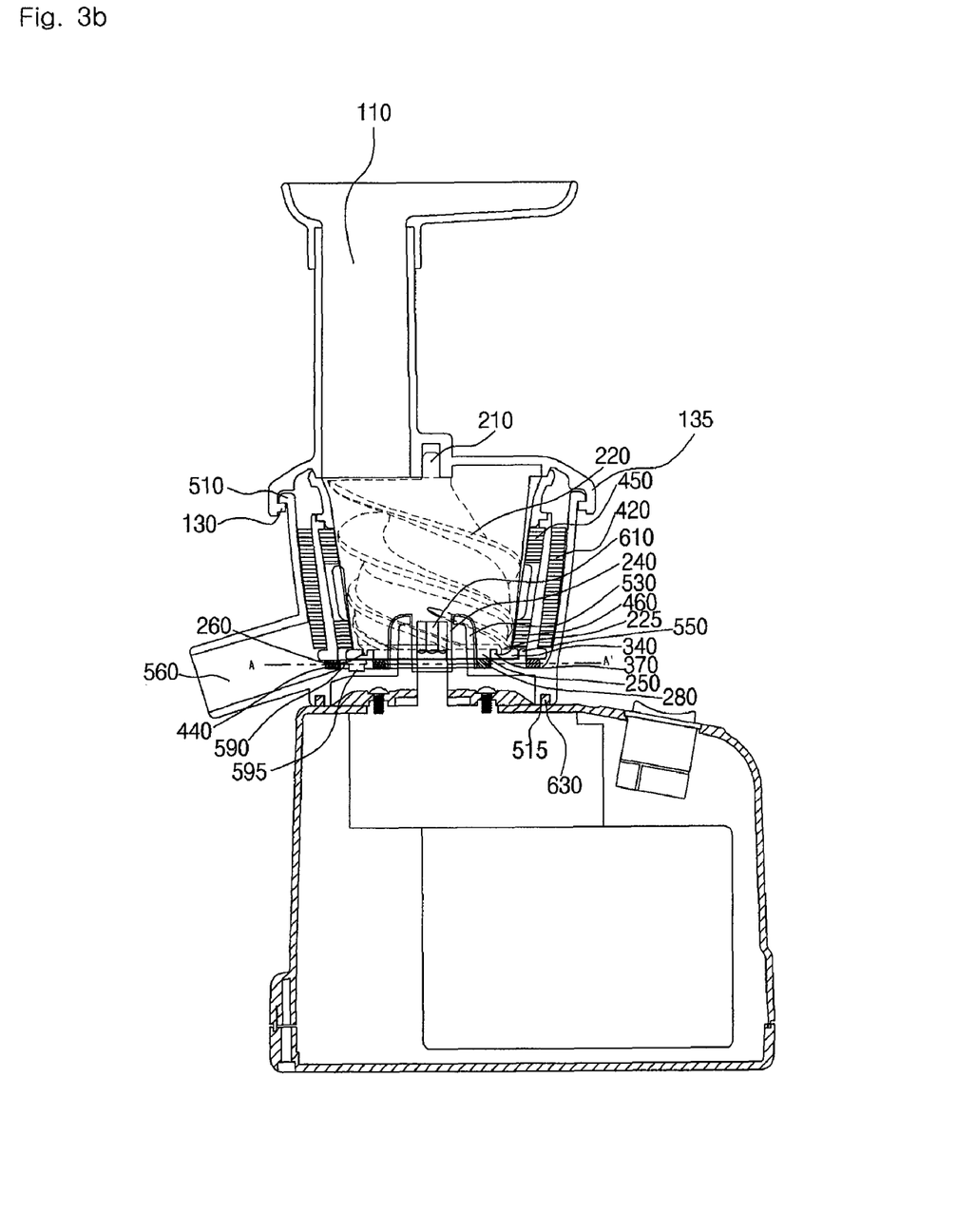
FIG. 3B is a sectional view of a juice outlet port of a juice extractor according to an embodiment of the present invention.
Figure 4:
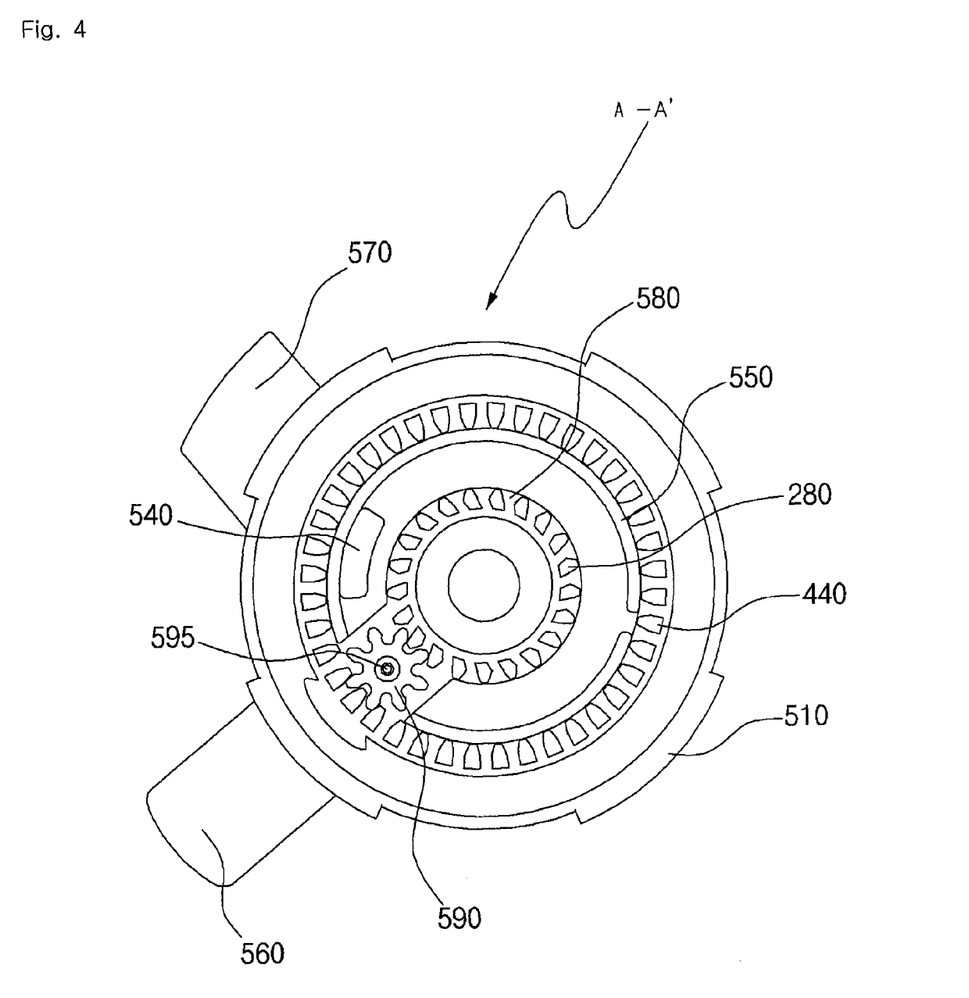
FIG. 4 is a plan view of a housing of a juice extractor according to an embodiment of the present invention.
Figure 5:
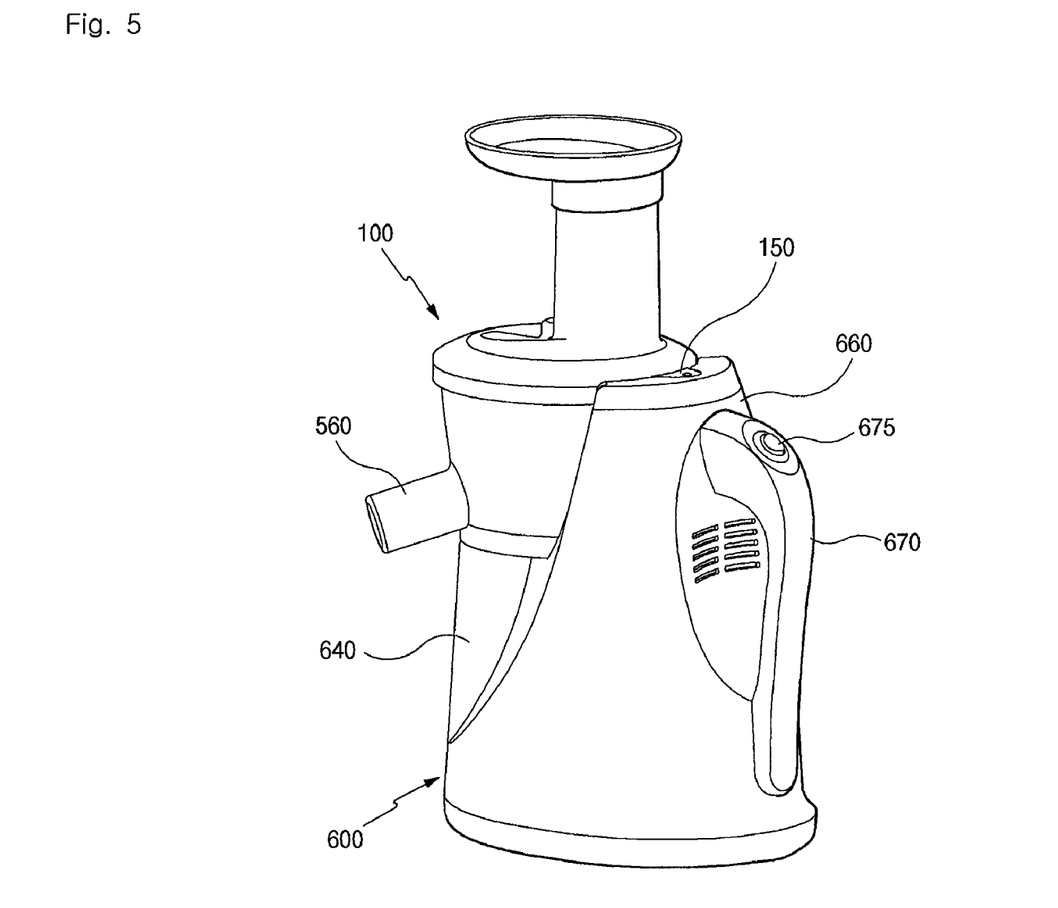
FIG. 5 is a perspective view of a juice extractor according to another embodiment of the present invention.
Figure 6:
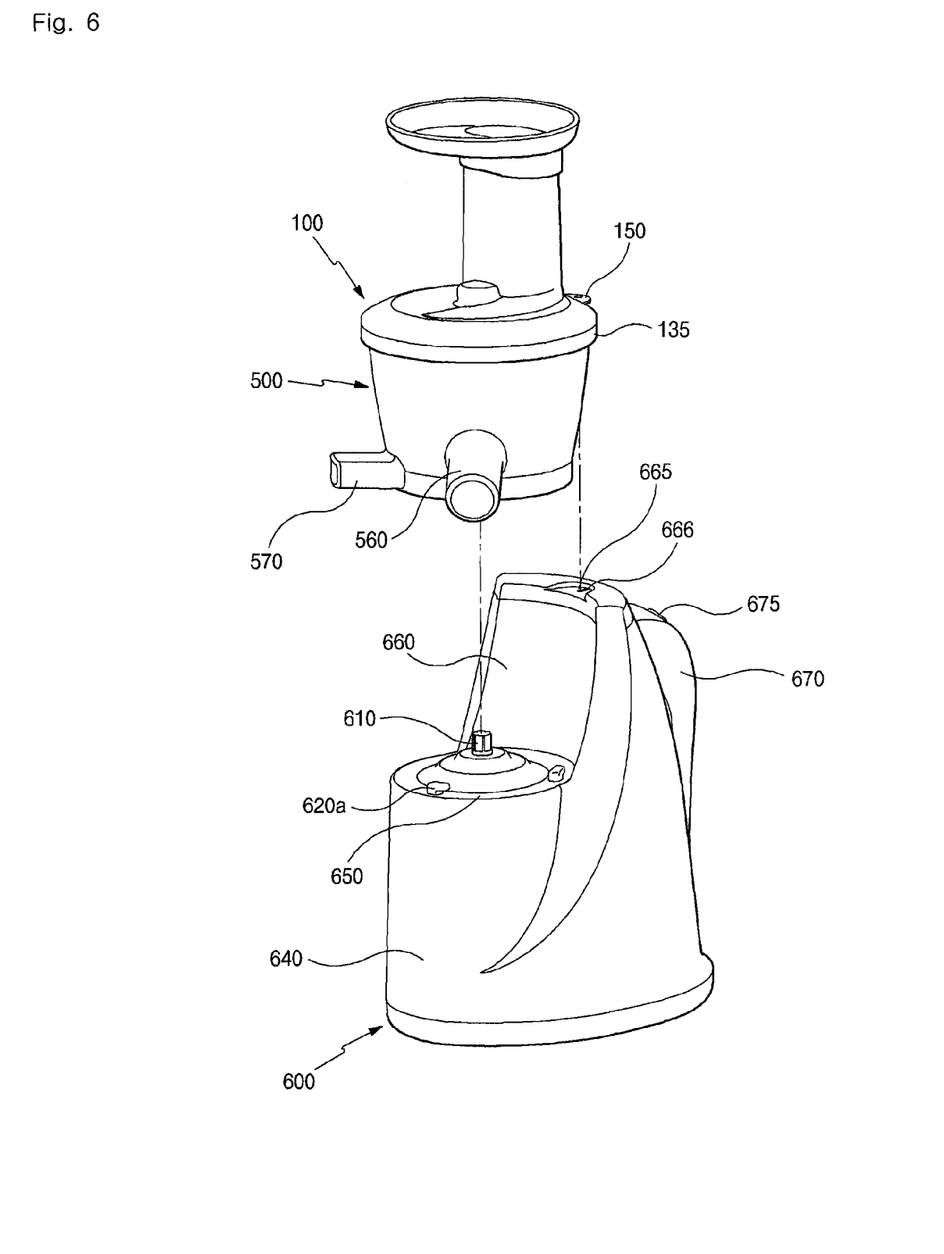
FIG. 6 is a perspective view of a covered housing secured to a drive unit according to another embodiment of the present invention.
Figure 7:
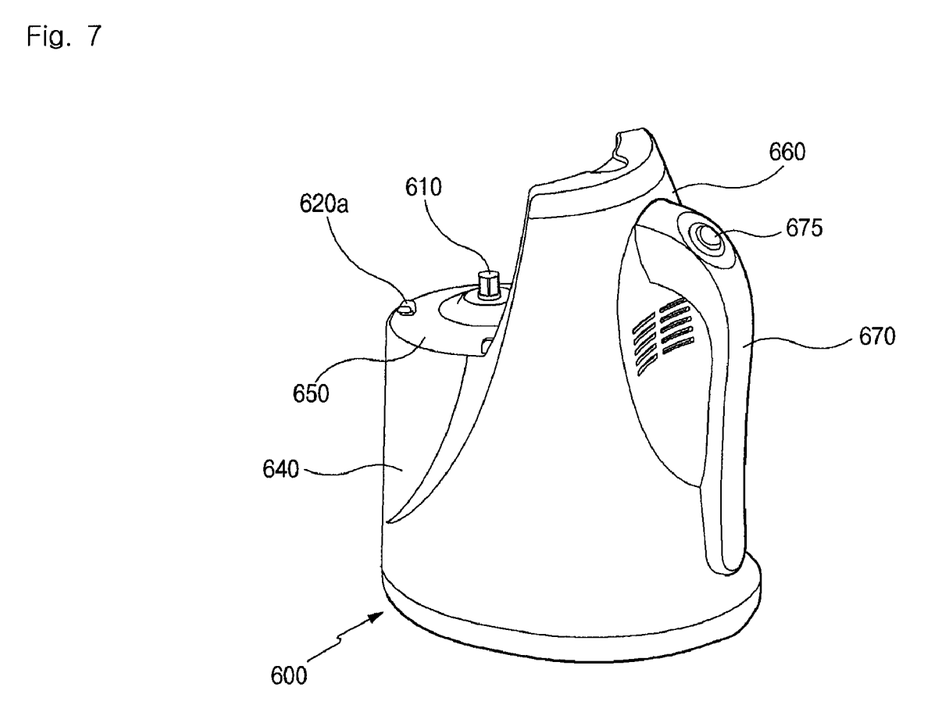
FIG. 7 is a perspective view of a drive unit of a juice extractor according to another embodiment of the present invention.

FIG. 2 is an exploded perspective view of a juice extractor according to an embodiment of the present invention. FIG. 3A is a sectional view of a draff outlet port of a juice extractor according to an embodiment of the present invention, and FIG. 3B is a sectional view of a juice outlet port of a juice extractor according to an embodiment of the present invention. FIG. 4 is a plan view of a housing of a juice extractor taken along the line A-A' in FIG. 3B. FIG. 5 is a perspective view of a juice extractor according to another embodiment of the present invention. FIG. 6 is a perspective view of a covered housing secured to a drive unit according to another embodiment of the present invention, and FIG. 7 is a perspective view of a drive unit of a juice extractor according to another embodiment of the present invention.

Referring to FIGS. 2 to 4, a juice extractor according to an embodiment of the present invention will be described. The juice extractor according to an embodiment of the present invention includes a cover 100, a screw 200, a mesh drum 300, a rotary brush 400, a housing 500, and a drive unit 600.

A cover 100 has a wide lower part, and an inlet port 110 is formed through an upper surface of the cover 100. In the center of a lower surface of the cover, a rotary shaft hole 120, into which a rotary shaft of the screw 200 is inserted, is formed. It is preferable that the rotary shaft hole 120 is formed in the center of the cover 100, and the inlet port 110 is eccentrically formed from the center in which the rotary shaft hole 120 is positioned so that the rotation of the screw 200 and the input of materials can be smoothly performed.

In addition, a plurality of engagement jaws 130 are formed to project from the border of a lower end part of the cover 100, and a slant surface 140 is formed on a lower end surface of the inlet port 110 in a rotating direction of the screw 200.

An upper rotary shaft 210, which is formed in the center of an upper part of the screw 200, is inserted into the rotary shaft hole 120 of the cover 100 to be rotated. A plurality of screw spirals, which are in contact with an inner part of the mesh drum 300, are formed on an outer surface of the screw 200.

At the lower end of the screw 200, an inner ring 250 having a plurality of screw gears 280 formed thereon is formed to project downward, and between the lower rotary shaft 240 and the inner ring 250, a lower space 270 is formed. In the center of a lower part of the screw 200 that is inside the inner ring 250, there is provided a lower rotary shaft 240 having a polygonal shaft hole 230 formed thereon.

It is preferable that the screw gear is in the form of a wing.

In the end part of a lower part of the spirals of the screw 200, a discharge jaw 225 is formed by internally cutting the lower border of the screw 200, and serves to discharge draff, which has been transferred to the bottom surface of the mesh drum 300, out of the mesh drum 300.

Preferably, on the outer periphery of the inner ring 250, an outer ring 260 is formed to project downward. This outer ring 260 is provided to extend the contact area with the draff that is pushed by the discharge jaw 225 of the screw and is discharged out of the mesh drum 300. In addition, a circular projection insertion hole 290 is formed between the inner ring 250 and the outer ring 260.

On inner wall of the mesh drum 300, wall blades 310, which include long blades and short blades, are longitudinally projected at predetermined intervals. It is preferable that the height of projected wall blades is decreased toward the lower part of the wall blades so that the wall blades 310 crush the materials fine as the materials are moved downward by the screw 200.

The outer wall of the mesh drum 300 has a mesh structure so that the juice extracted from the grinded material passes through the mesh structure. It is preferable that the size of the mesh is gradually decreased toward the lower part of the mesh structure since the size of the material particles is decreased toward the lower part of the mesh drum 300. In addition, since the material is finely grinded at an intermediate height of the mesh drum 300, the intermediate part of the mesh drum 300 has a sealing structure rather than a mesh structure so as to prevent the draff from being caught in the mesh structure or from slipping through the mesh structure and being mixed with the juice.

On the inner surface of the intermediate part of the mesh drum 300 that has the sealing structure, a plurality of grinding blades 390 are formed to project in addition to the wall blades 310. A strain net 320 is formed at an upper part of the mesh structure formed on the outer wall of the mesh drum 300, and a pressing net 330 of fine meshes is formed at a lower part of the mesh structure.

A bottom ring 340 having an inner ring insertion hole 380 formed thereon is formed at a lower end of the mesh drum 300 to form the bottom surface of the mesh drum 300 that covers the inner ring 250 of the screw 200, and a discharge slant surface 350 in the form of a circular arc of which the depth is increased in a rotating direction of the screw 200 is formed on the upper surface of the bottom ring 340. Also, a mesh drum discharge hole 360 for discharging the draff out of the mesh drum 300 is formed at the end of the discharge slant surface 350.

Accordingly, the material transferred to the intermediate part along the wall blades 310 of the mesh drum 300 is further grinded at the intermediate part where plural grinding blades 390 exist. In the case of soymilk, a portion of the soymilk is discharged out of the mesh drum 300 through the strain net 320, and the remaining portion of the soymilk is further grinded to be discharged out of the mesh drum 300 through the pressing net 330. The draff is discharged to the mesh drum discharge hole 360 along the discharge slant surface 350.

Preferably, a ring-shaped circular projection 370 is further formed at the lower edge of the mesh drum, and a circular groove 375 is further formed around the circular projection 370. In the circular groove 375, the outer ring 260 is rotatably inserted to extend the contact area with the draff being discharged to the outside. The circular projection 370 is inserted into the circular projection insertion hole 290, and serves to prevent the draff from moving toward a pressure discharge passage 580 by a high pressure.

The housing 500 accommodates the screw 200 and the mesh drum 300. A plurality of engagement projections 510 are formed on an upper periphery of the housing 500, and a waterproof cylinder 530 having a through hole 520 formed thereon is formed on a center lower end part of the housing 500, and is inserted into the lower space 270 of the screw 200. On one side of the bottom surface, a housing discharge hole 540 secured to the mesh drum discharge hole 360 is formed. On the lower side of the outer surface of the housing, a juice outlet port 560 and a draff outlet port 570 are provided, and on the bottom surface around the waterproof cylinder 530 of the lower end part, a pressure discharge passage 580 is formed so that the screw gear 280 of the screw is inserted into the passage 580 to be rotated.

On the lower surface of the housing 500, a fixing groove 515 is formed, and around the pressure discharge passage 580, a circular guide jaw 550 is formed around the pressure discharge passage 580 so that the bottom ring 340 of the mesh drum 300 is inserted into and fixed to the guide jaw 550 to fix the mesh drum 300. On the lower end of the housing discharge hole 540, a packing 575 made of rubber and so on is mounted. One side of the packing 575 is inserted into an insertion groove 576 formed on the bottom surface of the housing, and the other side thereof is in close contact with the outlet of the housing discharge hole 540.

Preferably, the pressure discharge passage 580 is connected to the juice outlet port 560.

The rotary brush 400 is mounted between the housing 500 and the mesh drum 300 to be rotated, and is provided with a brush holder 430 in which a brush for continuously sweeping the mesh drum 300 and the housing 500 is installed.

The brush is composed of a net brush 410 attached to the inner surface of the brush holder 430 to continuously sweep the outer wall of the mesh drum 300, and a housing brush 420 attached to the outer surface of the brush holder 430 to continuously sweep the inner wall of the housing 500.

The net brush 410 is composed of a pressing net brush 460 for scraping the strain net 320 of the mesh drum 300, and a pressing net brush 460 for sweeping the pressing net 330 of the mesh drum 300, which are attached to the brush holder 430 in consideration of the intermediate surface having a sealing structure as the boundary between them. The net brush 410 and the housing brush 420 may be formed in a body.

In order for the rotary brush 400 to sweep the mesh drum 300, the brush holder 430 is constructed to be rotated.

Preferably, a brush gear 440 is mounted on the lower part of the brush holder 430, and an intermediate gear is rotatably mounted on the lower surface of the housing 500 to be engaged with the brush gear 440. The intermediate gear 590, which is engaged with the screw gear 280, rotates the brush gear 440.

The intermediate gear 590 is inserted in an intermediate gear rotary shaft 595 that is formed on the lower surface of the housing so that the screw gear 280 is engaged with the intermediate gear 590 at the pressure discharge passage 580.

The drive unit 600 is provided with a polygonal shaft 610, which projects upward to be inserted into the polygonal shaft hole 230 of the screw 200 through the through hole 520 and rotates the screw at low speed, and a plurality of fixing projections 630 that are inserted into the fixing groove 515 of the housing 500 to fix the housing 500.

The polygonal shaft 610 is connected to a motor and a speed reducer (not illustrated) to be rotated.

A plurality of engagement jaws 130 are projected on the border of the lower end part of the cover 100, and a plurality of engagement projections 510 are formed on the outer periphery of an upper end of the housing 500. As the engagement projections 510 are engaged with the engagement jaws 130, the cover 100 is detachably secured to the housing 500.

On the upper surface of the drive unit 600, a pair of engagement hooks 620, which are fixed to the housing 500 secured to the cover 100, are further provided on the upper surface of the drive unit 600 to prevent vibration of the juice extractor.

The speed reducer used in the present invention serves to reduce the rotating speed of the motor, and makes the screw rotate at a very low speed in comparison to the screw of the conventional juice extractor.

The operation of the juice extractor as constructed above according to embodiments of the present invention will be described.

When materials are put into the inlet port 110 of the cover 100, they are move inside the mesh drum 300 along the slant surface 140 formed on the lower surface of the cover 100. The materials moved into the mesh drum 300 are finely grinded and pressed as they are compulsorily conveyed downward by the rotation of the screw 200 and the wall blades 310. Juice produced in this process flows out of the mesh drum through meshes formed on the outer wall of the mesh drum 300, and then are discharged through the juice outlet port 560.

The draff that reaches the bottom ring 340 of the mesh drum 300 by the rotation of the screw 200 is pushed by the discharge jaw 225 at the lower end of the screw 200, and is guided to the mesh drum discharge hole 360 along the discharge slant surface 350. In this case, if the packing 575 that blocks up the outlet of the housing discharge hole 540 is pressed with a specified pressure, a gap is produced between the outlet of the discharge hole 540 and the packing, and through this gap, the draff is discharged. The discharged draff is then discharged out of the draff outlet port 570 of the juice extractor.

The grinded materials are finally pressed at the bottom ring 340 of the mesh drum 300. In this process, the most part of juice flows to the outside through the meshes formed on the outer wall of the mesh drum 300 and then is discharged through the juice outlet port 560, and only a part of juice is pushed into the gap between the inner ring 250 of the screw 200 and the inner ring insertion hole 380 of the mesh drum 300 to flow to the pressure discharge passage 580. However, since the pressure discharge passage 580 is connected to the juice outlet port 560, the part of juice is finally discharged to the outside through the juice outlet port 560.

If the pressure discharge passage 580 is not connected to the juice outlet port 560, the juice pushed with pressure to the gap between the inner ring 250 of the screw 200 and the inner ring insertion hole 380 flows over the waterproof cylinder 530 and is discharge out of the housing through the gap between the through hole 520 and the polygonal shaft 610. This may cause the pollution of the motor or speed reducer of the drive unit 600 and the leakage through the outer surface of the juice extractor.

Even if the juice is thick and thus cannot flow naturally, it is compulsorily guided to the juice outlet port 560 by the screw gear 280 of the inner ring 250.

The reason why the screw gear 280 is in the form of a wing is to compulsorily discharge the thick juice having a high viscosity to the juice outlet port 560 more efficiently.

The screw gear 280 serves to rotate the rotary brush 400 by transferring the power of the drive unit 600 to the rotary brush 600. In other words, since the screw gear 280 is engaged with the brush gear 440 by the intermediate gear 590, the brush holder 430 is rotated as the screw 200 is rotated by the drive unit 600. Accordingly, the mesh brush 410 mounted on the brush holder 430 and the housing brush 420 continuously sweep the outer wall of the mesh drum 300 and the inner wall of the housing 500, respectively, and thus can make the thick juice or soymilk flow effectively. Also, since the outer wall of the mesh drum 300 is continuously swept, it is not required for a user to frequently disassemble and clean the mesh drum 300.

The inner surface of the intermediate part of the mesh drum 300 has a sealing structure, and a plurality of grinding blades 390 are projected therefrom in addition to the wall blades 310. The strain net 320 is formed at the upper part of the mesh drum 300, and the pressing net 330 of fine meshes is formed at a lower part of the mesh drum 300.

Accordingly, the juice produced while the materials are compulsorily transferred along the wall blades 310 of the mesh drum 300 flows to the outside through the strain net 320, and the juice produced while the materials are finely grinded at the inner surface of the intermediate part having the sealing structure in which a plurality of grinding blades 390 exist is discharged to the juice outlet port 560 through the pressing net 330.

The draff is discharged to the mesh drum discharge hole 360 along the discharge slant surface 350 of the bottom.

At this time, the outer ring 260 serves to smoothly move and discharge the draff by extending the contact area with the draff that is pushed to move along the discharge slant surface 350 by the discharge jaw 225 of the screw 200 and is guided to the mesh drum discharge hole 360.

The circular projection 370 is inserted into the circular projection insertion hole 290 of the lower part of the screw without any gap therebetween, and suppresses at maximum the inflow of the draff into the pressure discharge passage 580 even if a pressure is applied to the draff at the bottom ring 340.

In addition, since the screw 200 and the mesh drum 300 are longitudinally assembled in the housing 500, the speed at which the materials are moved downward is heightened and the juice inside the housing 500 easily flows downward without remaining in the housing 500, in comparison to the conventional juice extractor in which the screw and the mesh drum are horizontally assembled.

A juice extractor according to another embodiment of the present invention will be described with reference to FIGS. 5 to 7.

The juice extractor according to another embodiment of the present invention includes a cover 100, a screw 200, a mesh drum 300, a rotary brush 400, a housing 500, and a drive unit 600. Since the screw 200, the mesh drum 300, the rotary brush 400, and the housing 500 are the same as those of the juice extractor according to one embodiment of the present invention, detailed explanation thereof will be omitted. Also, the operations thereof are the same as those in one embodiment of the present invention, detailed explanation thereof will be omitted.

In another embodiment of the present invention, a securing projection 150 is formed on the outer periphery 135 of the cover 100, and a projection part is formed in the center of the securing projection 150. The securing projection 150 is positioned in the rear under the assumption that the juice outlet port 560 and the draff outlet port 570 of the housing 500 are positioned in the front. The cover 100 is secured to the housing 500 in which the screw 200, the mesh drum 300, and the rotary brush 400 are installed, and then the housing 500 is mounted on the drive unit 600.

The drive unit 600 includes a base frame 640 in which a motor and a control device (not illustrated) are installed, a housing engagement surface 650 formed on an upper surface of the base frame 640, a polygonal shaft 610 of the motor formed to project in the center of the engagement surface 650, a plurality of engagement hooks 620a formed on an outer periphery of the engagement surface 650 to secure the housing 500, a support frame 660 having a mounting surface formed on one side of the housing engagement surface 650 of the base frame 640 to correspond to a side surface of the housing 500, and extending from the base frame to support the housing 500, a securing groove 665 which is formed on an upper surface of the support frame 660 and to which the securing projection 150 of the cover 100 is secured, and a handle unit 670 extending from an upper end of a rear surface of the housing mounting surface of the support frame 660 to a lower end of the base frame 640.

The engagement hooks 620a, which are formed on the housing engagement surface 650, are inserted into the engagement groove (not illustrated) formed on a bottom surface of the housing, and then the housing 500 is fixed to the engagement surface 650 by slightly rotating the housing 500.

At the center part of the securing groove 665, a micro switch 666 is installed. When the securing projection 150 formed on an outer periphery 135 of the cover 100 is secured to the securing groove 665, the projection part of the securing projection presses the micro switch 666 to operate an operation switch 675, while when the securing projection 150 is not secured to the securing groove 665, the micro switch 66 is not turned on, so that the operation switch 675 cannot operate the juice extractor.

INDUSTRIAL APPLICABILITY

As can be seen from the foregoing, the juice extractor according to the present invention has the following effects.

First, by adopting a screw squeezing at a very low speed instead of crushing using a high-speed rotating blade, various nutrients and intrinsic flavor contained in juice, soymilk, and so forth, are maintained to the fullest extent, and the extensive juice extraction is possible irrespective of the kinds of vegetables and fruits.

Second, since the housing of the juice extractor is longitudinally assembled to the upper side of the drive unit, the materials are naturally moved downward by the gravity and the rotation of the screw, and the juice-extracting speed is heightened. Accordingly, the extracted juice well flows downward without remaining in the housing, and thus any kind of vegetables and fruits can be juiced promptly.

Third, since the screw is bidirectionally fixed, the vibration of the screw is prevented, and thus shaking or striking of the screw against the inner wall of the mesh drum is prevented during the operation of the screw to reduce the noise occurrence and to prevent abrasion of the screw.

Fourth, a screw gear in the form of a wing is mounted on the lower surface of the inner ring of the screw, and thus an excellent juice-extraction performance can be achieved when making a thick fruit juice or soymilk.

Fifth, by connecting the pressure discharge passage, which is provided in the housing, to the juice outlet port, the inflow of the juice to the drive unit can be prevented.

Sixth, by additionally forming the outer ring on the screw, the draff is discharged more smoothly, and by forming the circular projections on the mesh drum, the inflow of the draff to the pressure discharge passage is minimized.

Seventh, by forming the slat surface on one side of the lower surface of the juice extractor cover, the materials are automatically put in the inlet port without pressing the materials downward.

Eighth, by installing the rotary brush that can continuously clean the meshes between the mesh drum and the housing, it is not required for a user to frequently disassemble and clean the juice extractor.

Ninth, by installing the brush gear at the lower part of the rotary brush and rotating the brush via the intermediate gear connected to the screw gear that is rotated by the drive unit, no power is separately required.

Tenth, since the packing is inserted into the outlet of the housing discharge hole and a gap is produced between the packing and the outlet only when a specified pressure is applied to the packing, the juice discharged to the draff outlet port can be reduced at maximum.

Eleventh, since the micro switch mounted on the drive unit is operated only when the housing assembled with all the components is mounted on the drive unit, the safety of the juice extractor is increased and unnecessary power consumption is reduced to save the energy.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A juice extractor comprising:
  a cover having an inlet port formed on one side of an upper part thereof and a rotary shaft hole formed in a center of an inner part thereof;

a housing installed on a lower part of the cover, the housing having a guide jaw formed on a bottom of the housing, a draff outlet port and a juice outlet port formed apart from each other on a lower end part of the housing, a waterproof cylinder having a through hole formed in a center of the lower end part of the housing, and a pressure discharge passage formed around a lower part of the waterproof cylinder;

a screw having an upper rotary shaft formed on an upper part of the screw to be rotatably inserted into the rotary shaft hole, a plurality of screw spirals formed on an outer surface of the screw, an inner ring formed at a lower end of the screw to project downward and having a plurality of screw gears rotatably inserted into the pressure discharge passage, a lower space formed inside the inner ring to receive the waterproof cylinder therein, and a lower rotary shaft formed in a center of a lower part of the screw and a polygonal shaft hole formed thereon;

a mesh drum insertable into the guide jaw of the housing, the mesh drum having a mesh structure formed on an outer wall of the mesh drum to discharge juice to the juice outlet port, and a plurality of wall blades longitudinally formed on an inner surface of the mesh drum;

means disposed between the housing and the mesh drum for rotation and for continuously sweeping the mesh drum and the housing;

and a drive unit having a polygonal shaft that is inserted into the polygonal shaft hole through the through hole of the waterproof cylinder, and rotating the screw at a low speed;

wherein the housing accommodating the screw is longitudinally fixed to an upper side of the drive unit so as to press, grind and extract juice from materials put into the inlet port and to discharge a draff.

2. The juice extractor of claim 1, wherein the pressure discharge passage of the housing is connected to the juice outlet port.

3. The juice extractor of claim 1, further comprising:
a discharge jaw formed at an end of a lower part of the spirals of the screw by internally cutting a lower border of the screw;
a bottom ring formed at an end of a lower part of the mesh drum, and having an inner ring insertion hole formed thereon to accommodate the inner ring;
a discharge slant surface formed on an upper surface of the bottom ring, the discharge slant surface being in the form of a circular arc of which the depth is increased in a rotating direction of the screw; a mesh drum discharge hole connected to an end of the discharge slant surface to discharge the draff out of the mesh drum; and a housing discharge hole formed on one side of the bottom of the housing and connected to the mesh drum discharge hole and the draff outlet port;
wherein the discharge jaw discharges the draff to the draff outlet port through the housing discharge hole by pushing the draff to the mesh drum discharge hole as the discharge jaw is rotated along the discharge slant surface.

4. The juice extractor of claim 3, wherein a circular projection is formed at an edge of an inner side of the bottom ring, a circular groove is formed on an outer side of the circular projection, an outer ring is formed on an outer periphery of the inner ring to project downward, and a circular projection insertion hole is formed between the inner ring and the outer ring;
wherein the outer ring is rotatably inserted into the circular groove to extend a contact area with the draff being guided by the discharge jaw, and the circular projection is inserted into the circular projection insertion hole to minimize an inflow of the draff to the pressure discharge passage.

5. The juice extractor of claim 1, wherein a strain net and a pressing net having a plurality of meshes formed thereon are formed on an upper part and a lower part of an outer wall of the mesh drum, and a sealing structure in which a plurality of grinding blades are longitudinally formed is formed between the strain net and the pressing net; wherein the juice is discharged to the juice output port through the strain net and the pressing net.

6. The juice extractor of claim 1, wherein a plurality of engagement jaws are formed on a border of a lower end part of the cover, a plurality of engagement projections are formed on an outer periphery of an upper end of the housing, and engagement hooks are formed on the drive unit;
wherein the housing that is secured to the cover by the engagement of the engagement jaws with the engagement projections is detachably secured to the drive unit by the engagement hooks.

7. The juice extractor of claim 1, wherein the means for rotation and for continuously sweeping the mesh drum and the housing includes a net brush attached to an inner surface of the brush holder to continuously sweep the outer wall of the mesh drum, and a housing brush attached to an outer surface of the brush holder to continuously sweep the inner wall of the housing.

8. The juice extractor of claim 1, wherein a brush gear is mounted on a lower part of the brush holder, and an intermediate gear is rotatably mounted on the lower surface of the housing to be engaged with the brush gear; wherein the intermediate gear, which is engaged with the screw gear, rotates the brush gear.

9. The juice extractor of claim 1, wherein a slant surface is formed on a lower end surface of the inlet port of the cover in the rotating direction of the screw.

10. The juice extractor of claim 3, further comprising an elastic packing mounted on one side of the bottom surface of the housing discharge hole, one side of the packing being inserted into an insertion groove formed on the bottom surface of the housing to achieve sealing, and the other side thereof being in close contact with an outlet of the housing discharge hole.

11. The juice extractor of claim 1, wherein the cover further comprises a securing projection formed on an outer periphery of the cover, the securing projection being positioned in an area substantially opposite to the juice outlet port and the draff outlet port of the housing.

12. The juice extractor of claim 11, wherein the drive unit comprises:
a base frame in which a motor and a control device are installed;
a housing engagement surface formed on an upper surface of the base frame;
a polygonal shaft of the motor formed to project in the center of the engagement surface;
a plurality of engagement hooks formed on an outer periphery of the engagement surface to secure the housing;
a support frame having a mounting surface formed on one side of the housing engagement surface of the base frame to correspond to a side surface of the housing and extending from the base frame to support the housing;
a securing groove which is formed on an upper surface of the support frame and to which the securing projection of the cover is secured; and a handle unit extending from an upper end of a rear surface of the housing mounting surface of the support frame to a lower end of the base frame.

13. The juice extractor of claim 1, wherein the means for rotation and for continuously sweeping the mesh drum and the housing comprises a rotary brush and a brush holder in which the rotary brush is installed.

* * * * *